US007737838B2

(12) United States Patent
Dagci

(10) Patent No.: US 7,737,838 B2
(45) Date of Patent: Jun. 15, 2010

(54) METHOD AND APPARATUS FOR TRANSMISSION OF WIRELESS SIGNALS IN A MOBILE PLATFORM

(75) Inventor: Oguz H. Dagci, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 925 days.

(21) Appl. No.: 11/538,068

(22) Filed: Oct. 3, 2006

(65) Prior Publication Data

US 2007/0126569 A1 Jun. 7, 2007

Related U.S. Application Data

(60) Provisional application No. 60/723,152, filed on Oct. 3, 2005.

(51) Int. Cl.
 *G08B 1/00* (2006.01)
 *G08B 1/08* (2006.01)
 *H04Q 1/30* (2006.01)
 *H04M 11/04* (2006.01)
(52) U.S. Cl. ..................... 340/531; 340/533
(58) Field of Classification Search ......... 340/533–538, 340/310.11–310.18, 933–943; 307/1–4, 307/9.1–10.1
 See application file for complete search history.

(56) References Cited

U.S. PATENT DOCUMENTS

| | | | | |
|---|---|---|---|---|
| 3,818,466 A | * | 6/1974 | Honda | 340/517 |
| 4,603,318 A | * | 7/1986 | Philp | 340/538.11 |
| 4,663,716 A | * | 5/1987 | Kubo | 701/79 |
| 4,916,643 A | * | 4/1990 | Ziegler et al. | 702/188 |
| 6,762,993 B1 | * | 7/2004 | Kurosawa | 370/227 |
| 6,885,296 B2 | | 4/2005 | Hardman et al. | |
| 6,944,528 B2 | | 9/2005 | Nagano | |
| 7,046,166 B2 | | 5/2006 | Pedyash et al. | |
| 2003/0146835 A1 | * | 8/2003 | Carter | 340/539.13 |
| 2004/0239498 A1 | * | 12/2004 | Miller | 340/539.13 |
| 2005/0113978 A1 | * | 5/2005 | Sharma et al. | 700/259 |

OTHER PUBLICATIONS

Lewis, F.L.,Wireless Sensor Networks, Smart Environments: Technologies, Protocols, and Applns, 2004, John Wiley, NY, NY, USA.
Shan, Q., Wireless Intelligent Sensor Networks for Refrigerated Vehicle, IEEE 6th CAS Symp. on Emerging Tech., May 2004, pp. 525-528, IEEE. Shanghai, China.
Akyildiz, W., Wireless Sensor Networks: A Survey, Computer Networks, 2002, pp. 393-422, vol. 38, Elsevier Science B.V., Atlanta, GA, USA.
Costlow, T., Safety Drives Sensor Growth; Automotive Engineering Int'l, Apr. 2005, pp. 65-72, SAE, Warrendale, PA, USA.

* cited by examiner

*Primary Examiner*—Benjamin C Lee
*Assistant Examiner*—Michael Shannon

(57) ABSTRACT

There is provided a method and system for communicating a signal output from a wireless sensor to a processor on a mobile platform upon interruption of wireless communications with the processor. The wireless sensor is signally connected to a local processor operative to wirelessly communicate with the processor. A second sensor is signally connected to first and second inputs of the processor via an electrical cable. The local processor is operative to selectively interrupt signal transmission from the second sensor to the processor effective to identify the wireless sensor and effective to communicate the wireless sensor signal via the second input of the processor.

22 Claims, 3 Drawing Sheets

METHOD AND APPARATUS FOR TRANSMISSION OF WIRELESS SIGNALS IN A MOBILE PLATFORM

CROSS-REFERENCE TO RELATED APPLICATIONS

This application claims priority from U.S. Provisional Application No. 60/723,152 filed Oct. 3, 2005, entitled METHOD AND APPARATUS FOR TRANSMISSION OF WIRELESS SIGNALS.

TECHNICAL FIELD

This invention pertains generally to vehicle systems, and more specifically to a method and apparatus to transmit sensor readings intended for wireless transmission within the vehicle system.

BACKGROUND OF THE INVENTION

New, affordable and reliable communications technologies enable the use of wireless devices on mobile platforms, e.g., motor vehicles, to transmit sensor signal information and actuator control commands. The primary advantages of wireless devices typically include an ability to customize an application, add features, and reduce costs. Faults in the wireless communications link, or delays in message delivery that exceed an admissible limit are undesirable. Solutions to preclude or accommodate incomplete message delivery include using high bandwidth transmission channels to overcome communication bottlenecks or using different transmission channels for every two or three sensors. However, in either case, the available bandwidth on each transmission channel is not effectively utilized, and, there are a limited number of available communications bands. Moreover, for every transmission channel, use of a different wireless transceiver increases system costs. One proposed solution in the literature comprises encoding sensor signals on common power supply lines, which involves additional circuitry to place a signal on the power supply at a signal source and interpret the signal at a signal sink. The addition of the circuitry serves to add system cost.

Therefore, there is a need for a cost-effective solution for transmitting signals in a mobile platform from a local controller to a main controller when wireless communications are interrupted.

SUMMARY OF THE INVENTION

To address the foregoing concerns, and in accordance with the invention described hereinbelow, there is provided a method and system for communicating a signal output from a wireless sensor to a processor on a mobile platform upon interruption of wireless communications with the processor. The wireless sensor is signally connected to a local processor operative to wirelessly communicate with the processor. A second sensor is signally connected to first and second inputs of the processor via an electrical cable. The local processor is operative to selectively interrupt signal transmission from the second sensor to the processor effective to identify the wireless sensor and effective to communicate the wireless sensor signal via the second input of the processor.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the drawings which form a part hereof, and wherein.

DETAILED DESCRIPTION OF AN EMBODIMENT OF THE INVENTION

Figure 1:
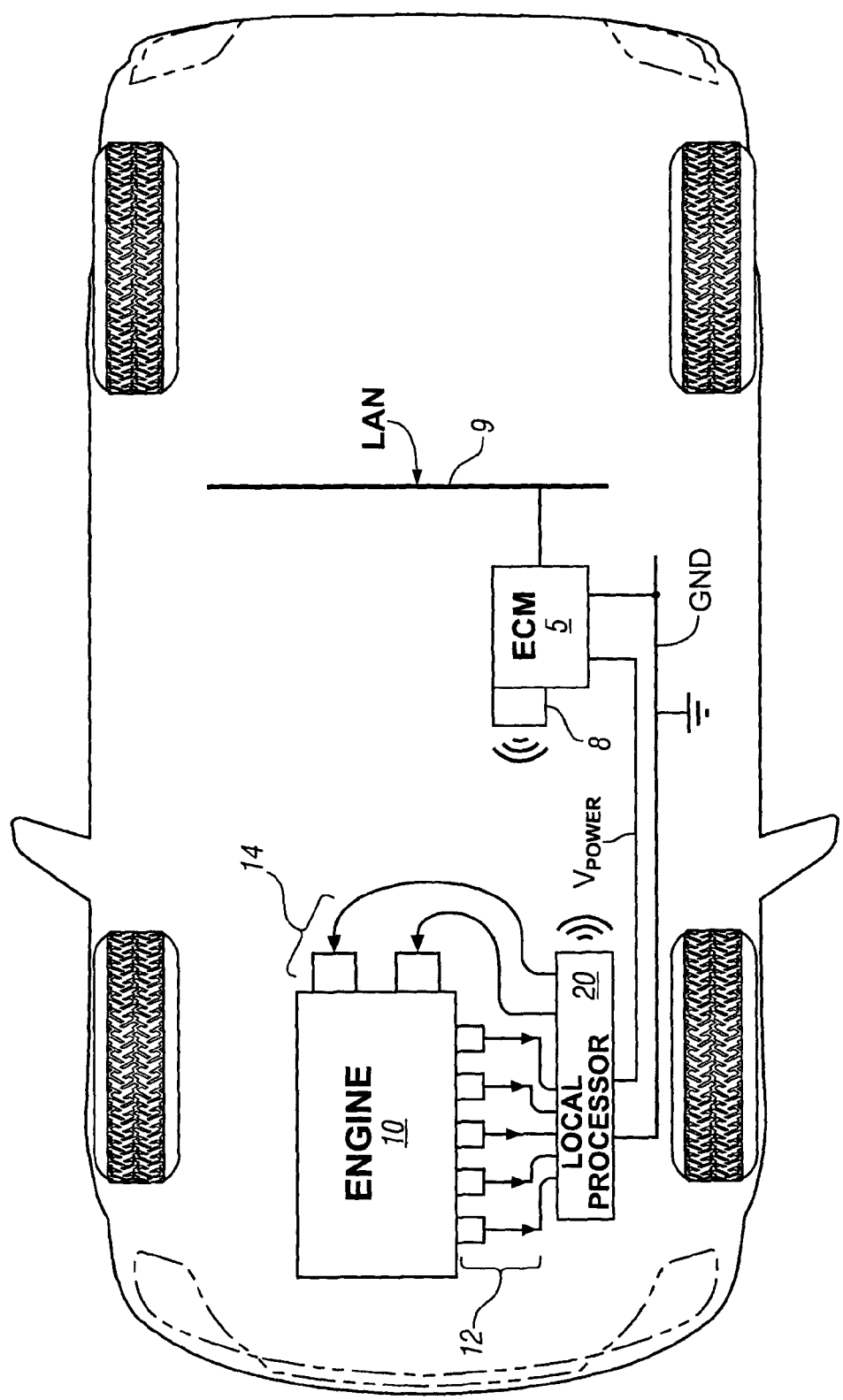
FIG. 1 is a schematic diagram of a mobile platform, in accordance with the present invention.
Figure 2:
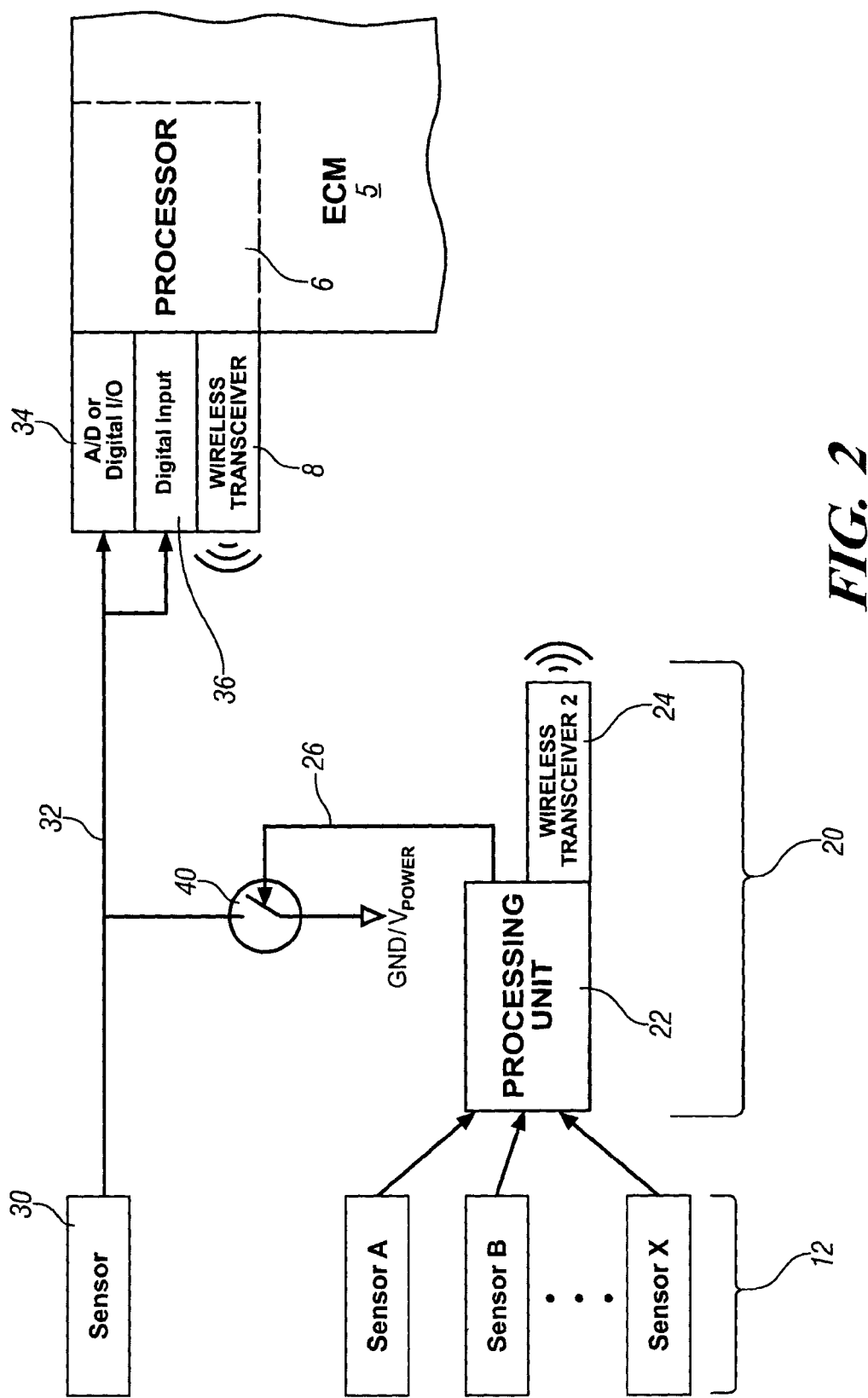
FIG. 2 is a schematic diagram of a circuit, in accordance with the present invention; and, FIGS. 3 and 4 comprise datagraphs, in accordance with the present invention.

Referring now to the drawings, wherein the depictions are for the purpose of illustrating the invention only and not for the purpose of limiting the same, FIGS. 1 and 2 depict a schematic of a communications system for a mobile platform which has been constructed in accordance with an embodiment of the present invention. The exemplary system comprises a plurality of remote sensing devices 12 and actuators 14, e.g., for an engine, that are signally and operatively connected to a local processor 20. The local processor comprises a processing unit 22 and at least one wireless transceiver 24 operative to communicate with at least one wireless transceiver 8 signally and operatively connected to a processor 6 that is preferably integrated into a central processor, e.g., an engine control module (ECM) 5. The system preferably includes a sensor 30 which is signally connected via an electrical cable 32 to first and second input/output (I/O) devices 34, 36 of the processor 6. The input/output (I/O) device 34 preferably comprises a device operative to monitor the input signal from the sensor 30, including either of an analog/digital converter or a digital input device. The analog/digital (A/D) converter is utilized when the sensor 30 generates a linear or analog signal, e.g., a throttle position sensor. The digital input device is utilized when the sensor generates a discrete signal, e.g., a variable reluctance crank sensor, or, when the sensor generates a digital signal. The input/output (I/O) device 36 preferably comprises a digital input device operative to monitor the input signal from the sensor 30. There is a signal line 26 output from the local processor 20, operative to control a switch 40, which is preferably normally open. The switch device 40, typically a FET/TTL transistor, connects the electrical cable 32 to electrical ground, GND, when closed by operation of the processor 20. Alternatively, the switch device 40 connects the electrical cable 32 to electrical power, $V_{POWER}$, when closed by operation of the processor 20. The operation of closing the switch device 40 and grounding the electrical cable 32, or connecting the electrical cable to system voltage, $V_{POWER}$, is described in detail hereinbelow.

By way of illustration, a mobile platform comprising a passenger vehicle is depicted in FIG. 1, having an internal combustion engine 10. It is understood that the principles described herein apply to any on-vehicle systems having localized operation and control, including wheel corner modules, in-door control systems, in-steering column control systems, entertainment systems, and others. The internal combustion engine 10 typically includes a plurality of sensing devices 12 and actuators 14. A subset of the engine sensing devices 12 are signally connected to local processor 20, and all or a subset of the engine actuators 14 are operatively connected to the local processor 20. The local processor 20 is operative to wirelessly communicate with the ECM 5 via communication between wireless transceiver 24 and wireless transceiver 8. Overall engine operation is controlled by the ECM 5. It is understood that one or more of the engine sensing devices and actuators can be directly signally connected to the ECM. By way of example, the sensing devices 12 signally connected to the local processor 20 can include sensors operative to monitor one or more of the following: ambient temperature, mass airflow, intake manifold pressure, crankshaft position, camshaft position, exhaust gases, throttle position, and, throttle pedal position, among others. By way of example, the engine actuators 14 can include electronic throttle control, exhaust gas recirculation ('EGR'), fuel injectors, variable valve actuation devices, and others.

The ECM 5 is preferably an element of an overall vehicle control system, comprising distributed control module architecture operable to provide coordinated system control, preferably signally connected over a local area network device (LAN) 9. The ECM 5 is operable to synthesize pertinent information and inputs from the aforementioned sensing devices, and execute algorithms to control various actuators to achieve control targets, including such parameters as fuel economy, emissions, performance, driveability, and protection of hardware. The ECM 5 is preferably a general-purpose digital computer generally comprising a microprocessor or central processor, storage mediums comprising read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning and buffer circuitry. A set of control algorithms, comprising resident program instructions and calibrations, is stored in ROM and executed to provide the respective functions of each computer. Algorithms are typically executed during preset loop cycles such that each algorithm is executed at least once each loop cycle. Algorithms stored in the non-volatile memory devices are executed by one of the central processors and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms can be executed in response to occurrence of an event.

Referring again to FIG. 2, the local processor 20 is referred to as a collection entity or gateway, comprising an electronic signal processor which receives signals from a plurality of sensors, as previously described. As shown in FIG. 2, the local processor 20 comprises processing unit 22 signally and operatively connected to wireless transceiver 24. The ECM 5 includes processor 6 signally connected to wireless transceiver 8. The processing unit 22 converts each sensor signal to a form that is transmissible from the wireless transceiver 24 to transceiver 8, and includes such functions as signal filtering, analog-to-digital (A/D) conversion, signal scaling and calibration, and others. When the local processor 20 is receiving a control signal from the ECM 5, e.g., to operate an actuator, the processing unit 22 is operative to convert the signal to an actuator control signal, e.g., a pulse-width modulated signal. The processing unit 22 is operative to encode input signals from the sensors 12 in a form transmissible to the central processor 6 of ECM 5 by controlling signal line 26 output from the local processor 20, as is described hereinbelow.

The local processor 20 is operable to transmit and communicate signals in an orderly fashion using the wireless transceiver 24, as shown. Local processors can be located anywhere in the vehicle. The transceivers each preferably employ known short-range digital communications protocols operative at low data transmission rates, in the range of less than 100 kbps (kilobytes per second). One such protocol is based upon IEEE 802.15.4 Standard for Information technology. Other communications protocols can be employed. The communication of signals over the transceivers preferably takes into account bandwidth of the data transmission channel, and factors related to the signal being communicated including a rate of change in physical parameters that are measured and response times of the sensors, which affects signal size and resolution.

The wireless communication link between local processor 20 and processor 6 may be temporarily interrupted, e.g., due to internal or external interference or component malfunctions. Interruption of wireless communications are generally detected by the local processor 20 based upon the specific communications protocol being utilized. Any interruption of communications can lead to a delay of communication of sensor readings out of the local processor 20 to the processor 6. Ultimately, the resulting bottlenecks can cause response time delays and instability in the operation of the vehicle. The invention comprises communicating sensor readings from one or more of the wireless sensors 12 utilizing existing wires used for other wired sensor feedback signals, or a single dedicated wire cable, shown as the wired sensor 30 and cable 32, wherein the local processor 20 selectively interrupts signal transmission from the wired sensor 30 to the processor 6. The interruption of the signal transmission is effective to identify the wireless sensor and effective to communicate the wireless sensor signal via the second input 36 to processor 6, as described hereinbelow.

Figure 3:
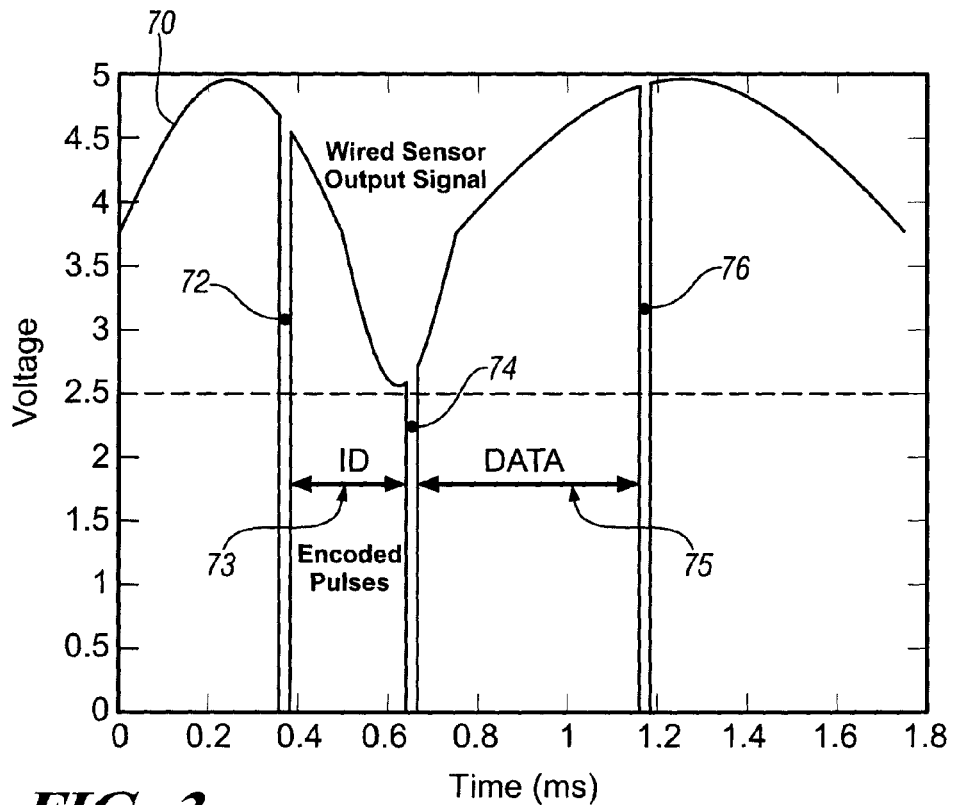
Figure 4:
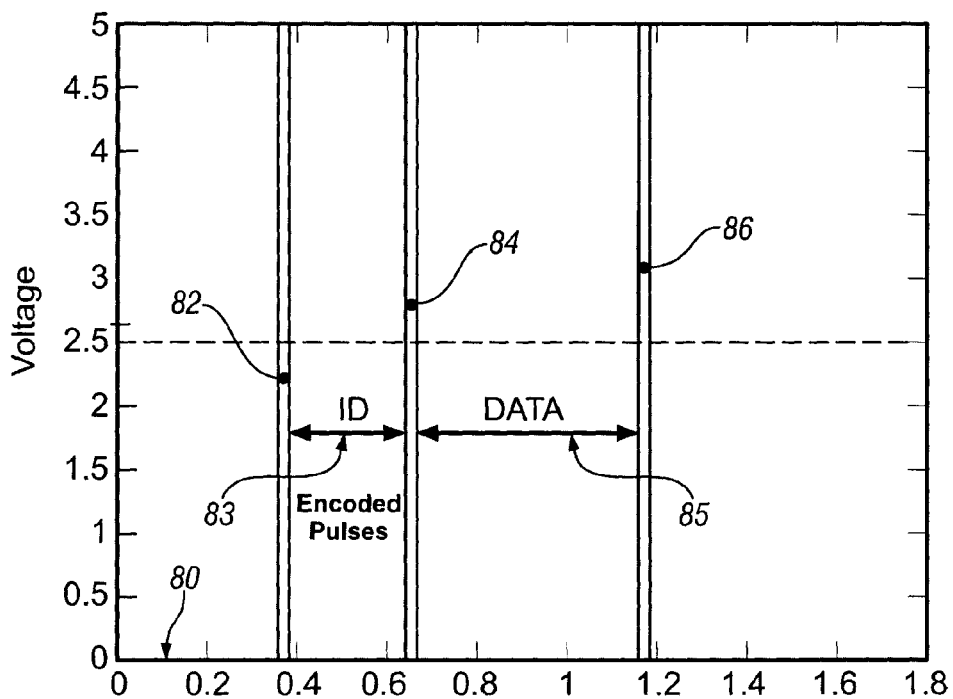

Referring now to FIGS. 3 and 4, datagraphs of exemplary signal outputs measured at input 36 are depicted, in accordance with the invention. FIG. 3 depicts an exemplary signal output 70 for the wired sensor 30, which comprises a device having a linear/analog output. FIG. 4 depicts an exemplary signal output 80 when the wired sensor 30 has a discrete, or a digital, output. In operation, the local processor 20 controls switch 40 to short sensor cable 32 to electrical ground, or to electrical power, in according with the encoding scheme.

The encoding scheme comprises a series of signal outputs from local processor 22 causing switch 40 to close and connecting cable 32 to electrical ground (or $V_{POWER}$), thus interrupting signal transmission from the sensor 30 to the processor 6. An first elapsed time (ID) 73, 83 between a first signal interruption event 72, 82 and a second signal interruption event 74, 84 is encoded to identify the specific sensor, i.e., one of sensors A, B, . . . X shown as item 12 in FIG. 2. A second elapsed time (DATA) 75, 85 between the second signal interruption event 74, 84 and a third signal interruption event 76, 86 (or electrical power event) is encoded to provide signal data from the identified sensor. In either of the depictions described above, when the sensor cable 32 is initially shorted to ground (or to $V_{POWER}$), an algorithm resident in the central processor 6 is triggered, causing it to measure elapsed time starting with the first signal interruption event 72, 82. The first elapsed time duration 73, 83 between consecutive signal interruption events is measured. The first elapsed time duration 73, 83 is interpreted as an identification number (ID), indicating which output of the plurality of sensors 12 is being transmitted. For example, a first sensor, e.g., Sensor A, can have an encoding identifier of 1.25 milliseconds, and a second sensor, e.g., Sensor B, can have an encoding identifier of 2.5 milliseconds, or another encoding identifier readily identified and distinguished in the central processing unit. The second elapsed time duration 75, 85 is interpreted as a parametric value of the signal reading of the indicated sensor. For example, a signal reading can correlate elapsed time and sensor output voltage. Thus, in this example, a second elapsed time can range from 0.0 to 5.0 milliseconds in duration, corresponding to a parametric output ranging from 0.0 volts to 5.0 volts for the exemplary sensor. This time duration value can be used by the central processing unit 6 as a substitute for the desired reading from the sensor that is normally transmitted wirelessly. The encoding scheme described herein is meant to be illustrative, and other encoding methods applicable to the concept can be utilized, within the scope of the invention.

The duration of each signal interruption event 72, 74, 76, 82, 84, 86 is preferably minimized to reduce risk of misreading the primary signal 70 from the sensor 30, and any corresponding effect on a control algorithm which relies thereon. A misreading of the primary signal 70, 80 from sensor 30 can be readily accommodated in the control algorithm, by utilizing previous sensor readings and a filtering algorithm to address any distortions on the primary signal 70.

With regard to input to devices 34, 36 preferably comprising analog and digital inputs respectively, the output value range of the wired sensor 30 can be designed to be above 2.5V, for CMOS-type digital inputs, to reserve digital 0 for the sign of the encoded pulse. If input device 36 comprises an A/D channel, such requirement does not exist on the output voltage range of the wired sensor. When the wired sensor reading 80 is a digital signal, the encoding scheme becomes as shown in FIG. 4.

The signal on the electrical cable 32 can be modulated, as the sign of the encoded pulse. In this method, the wire is shorted to ground with the help of switch 40. In order to increase the robustness of sensing, different modulation techniques can be used, such as shorting to ground (GND) followed by shorting to power supply ($V_{POWER}$), using a second switch device analogous to switch 40, connected to the power supply (not shown). Moreover, since the use of digital input requires the regular wired sensor signal to be above 2.5V for CMOS digital inputs, the central processor's digital inputs can be designed to internally accommodate a comparator, to eliminate the 2.5V threshold.

The algorithm can be implemented in an in-vehicle wireless sensor application, wherein multiple sensor readings are sent over a single transmission channel. In that application, there is always risk of not being able to transmit sensor readings on required moment to the central processor through wireless media.

In another embodiment of this invention, the method can be employed in specific applications to transmit signals from two sensors through a single electrical cable 32, without the wireless transceivers, to reduce wiring harness costs in a vehicle by transmitting a second signal on the single electrical cable 32.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. A method for communicating a signal output from a wireless sensor connected to a remote processor, the remote processor configured to wirelessly communicate the signal output from the wireless sensor to a processor within a mobile platform, comprising:

operating the remote processor to interrupt transmission of a signal output from a hardwired sensor to the processor, the interrupted transmission of the signal output identifying the wireless sensor at the processor; and operating the remote processor to interrupt transmission of the signal output from the hardwired sensor to the processor, the interrupted transmission of the signal output communicating the signal output from the wireless sensor to the processor.

2. The method of claim 1, further comprising: selectively interrupting transmission of the signal output from the hardwired sensor to the processor upon interruption of transmission of the wireless sensor signal.

3. The method of claim 1, wherein operating the remote processor to interrupt transmission of the signal output from the hardwired sensor to the processor, the interrupted transmission of the signal output identifying the wireless sensor at the processor comprises operating the remote processor to selectively execute first and second signal interruption events of the signal output from the hardwired sensor to the processor, wherein an elapsed time between the first and second signal interruption events identifies the wireless sensor at the processor.

4. The method of claim 3, wherein operating the remote processor to interrupt transmission of the signal output from the hardwired sensor to the processor, the interrupted transmission of the signal output communicating the signal output from the wireless sensor to the processor comprises operating the remote processor to selectively execute second and third signal interruption events of the signal output from the hardwired sensor to the processor, wherein an elapsed time between the second and third signal interruption events communicates the signal output from the wireless sensor to the processor.

5. The method of claim 4, wherein the elapsed time measured between the second and third signal interruption events is correlatable to a parametric value for the signal output from the wireless sensor.

6. The method of claim 1, wherein operating the remote processor to interrupt transmission of the signal output from the hardwired sensor to the processor, the interrupted transmission of the signal output communicating the signal output from the wireless sensor to the processor comprises selectively executing a pair of signal interruption events of the signal output from the hardwired sensor to the processor, wherein an elapsed time between the signal interruption events communicates the signal output from the wireless sensor to the processor.

7. The method of claim 6, wherein the elapsed time measured between the signal interruption events is correlatable to a parametric value for the signal output from the wireless sensor.

8. The method of claim 1, wherein operating the remote processor to interrupt transmission of the signal output from the hardwired sensor to the processor comprises electrically grounding the signal output from the hardwired sensor to the processor.

9. The method of claim 1, wherein operating the remote processor to interrupt transmission of the signal output from the hardwired sensor to the processor comprises electrically pulling the signal output from the hardwired sensor to the processor up to system voltage.

10. A system for communicating a signal output from a wireless sensor within a mobile platform, comprising:

the wireless sensor signally connected to a local processor operative to wirelessly communicate with a processor;

a second sensor signally connected via an electrical cable to first and second inputs of the processor; and, the local processor selectively interrupting signal transmission from the second sensor to the processor, the interrupted transmission of the signal output from the second sensor to the processor identifying the wireless sensor to the processor via the second input of the processor and communicating the signal output from the wireless sensor to the processor via the second input of the processor.

11. The system of claim 10, wherein the local processor selectively interrupting signal transmission from the second sensor to the processor, the interrupted transmission of the signal output from the second sensor to the processor identifying the wireless sensor to the processor via the second input of the processor comprises the local processor operative to selectively execute first and second signal interruption events of the electrical cable, wherein an elapsed time between the first and second signal interruption events identifies the wireless sensor to the processor.

12. The system of claim 11, wherein the local processor selectively interrupting signal transmission from the second sensor to the processor, the interrupted transmission of the signal output from the second sensor to the processor communicating the signal output from the wireless sensor to the processor via the second input of the processor comprises the local processor operative to selectively execute the second signal interruption event and a third signal interruption event of the electrical cable wherein an elapsed time between the second and third signal interruption events communicates the signal output from the wireless sensor to the processor.

13. The system of claim 10, wherein the local processor selectively interrupting signal transmission from the second sensor to the processor comprises the local processor selectively electrically grounding the electrical cable of the second sensor.

14. The system of claim 10, wherein the local processor selectively interrupting signal transmission from the second sensor to the processor comprises the local processor selectively electrically connecting the electrical cable of the second sensor to system voltage.

15. The system of claim 10, wherein the signal output from the wireless sensor comprises a linear signal.

16. The system of claim 10, wherein the signal output from the wireless sensor comprises a discrete signal.

17. The system of claim 10, wherein the signal transmission from the second sensor comprises a linear signal.

18. The system of claim 10, wherein the signal transmission from the second sensor comprises a discrete signal.

19. The system of claim 10, further comprising: the local processor selectively interrupting signal transmission from the second sensor to the processor upon an interruption of transmission of the wireless sensor signal.

20. A system for communicating a signal output from a wireless sensor within a mobile platform upon interruption of wireless transmission of the signal output, comprising:
the wireless sensor signally connected to a local processor wirelessly communicating the signal output from the wireless sensor to a processor;
a second sensor signally connected via an electrical cable to first and second inputs of the processor;
the local processor selectively interrupting signal transmission from the second sensor to the processor, the interrupted signal transmission identifying the wireless sensor to the processor via the second input of the processor and communicating the signal output from the wireless sensor to the processor via the second input of the processor.

21. The system of claim 20, wherein the local processor selectively interrupting signal transmission from the second sensor to the processor comprises the local processor selectively executing first and second signal interruption events of the electrical cable wherein an elapsed time between the first and second signal interruption events identifies the wireless sensor to the processor.

22. The system of claim 21, wherein the local processor selectively interrupting signal transmission from the second sensor to the processor comprises the local processor selectively executing the second signal interruption event and a third signal interruption event of the electrical cable wherein an elapsed time between the second and third signal interruption events communicates the signal output of the wireless sensor to the processor.

* * * * *